(12) United States Patent
Jost et al.

(10) Patent No.: US 11,027,981 B2
(45) Date of Patent: Jun. 8, 2021

(54) PROCESS FOR THE PREPARATION OF SILICATE AND ITS USE FOR THE PREPARATION OF PRECIPITATED SILICA

(71) Applicant: RHODIA OPERATIONS, Paris (FR)

(72) Inventors: Philippe Jost, Serpaize (FR); Leo Ricardo Bedore Dos Santos, Fazenda Santa Candida Campinas (BR); Daniella De Villefort Grossi, Campinas (BR)

(73) Assignee: RHODIA OPERATIONS, Paris (FR)

(*) Notice: Subject to any disclaimer, the term of this patent is extended or adjusted under 35 U.S.C. 154(b) by 0 days.

(21) Appl. No.: 15/768,287

(22) PCT Filed: Sep. 30, 2016

(86) PCT No.: PCT/EP2016/073401
§ 371 (c)(1),
(2) Date: Apr. 13, 2018

(87) PCT Pub. No.: WO2017/063901
PCT Pub. Date: Apr. 20, 2017

(65) Prior Publication Data
US 2018/0297854 A1 Oct. 18, 2018

(30) Foreign Application Priority Data
Oct. 15, 2015 (EP) .................................. 15306639

(51) Int. Cl.
*C01B 33/32* (2006.01)
*C01B 33/193* (2006.01)

(52) U.S. Cl.
CPC ............. *C01B 33/193* (2013.01); *C01B 33/32* (2013.01); *C01B 33/325* (2013.01)

(58) Field of Classification Search
CPC ........................... C01B 33/20; C01B 33/325
See application file for complete search history.

(56) References Cited

U.S. PATENT DOCUMENTS

| | | | |
|---|---|---|---|
| 3,511,601 A * | 5/1970 | Bieler ...................... C01B 33/32 423/206.1 |
| 5,403,570 A | 4/1995 | Chevallier et al. | |
| 5,833,940 A | 11/1998 | Reiber et al. | |
| 5,882,617 A | 3/1999 | Chevallier et al. | |
| 6,169,135 B1 | 1/2001 | Chevallier et al. | |
| 6,375,735 B1* | 4/2002 | Stephens ............... C01B 33/143 106/406 |
| 2003/0118500 A1 | 6/2003 | Chevallier et al. | |
| 2005/0032965 A1 | 2/2005 | Valero | |
| 2011/0178227 A1 | 7/2011 | Allain et al. | |
| 2013/0171051 A1 | 7/2013 | Clouin et al. | |

FOREIGN PATENT DOCUMENTS

| | | |
|---|---|---|
| CN | 103896256 A | 7/2014 |
| EP | 0520862 A1 | 12/1992 |
| EP | 670813 A1 | 9/1995 |
| EP | 670814 A1 | 9/1995 |
| EP | 917519 A1 | 5/1999 |
| JP | 2003171114 A | 6/2003 |
| WO | 9509127 A | 4/1995 |
| WO | 9509128 A | 4/1995 |
| WO | 9854090 A | 12/1998 |
| WO | 0174712 A | 10/2001 |
| WO | 03016215 A1 | 2/2003 |
| WO | 2004073600 A2 | 9/2004 |
| WO | 2005044727 A1 | 5/2005 |
| WO | 2009112458 A1 | 9/2009 |
| WO | 2012010712 A1 | 1/2012 |

OTHER PUBLICATIONS

Communication pursuant to Rule 114(2) EPC (Third Party Observations against Application) issued in European Application No. 16777662.4, dated Oct. 2, 2020 (16 pages).

Y. Fulong et al. "A New Method of Preparing Big Modulus Sodium Silicate and Active Charcoal from Rice Dusk Ash", Journal of Natural Science of Heilongjiang University, Sep. 1994, vol. 11, No. 3, pp. 101-104 (9 pages).

N. Hewitte, "Compounding Precipitated Silica in Elastomers", William Andrew Publishing, 2007 (11 pages).

* cited by examiner

*Primary Examiner* — Stuart L Hendrickson
(74) *Attorney, Agent, or Firm* — Osha Bergman Watanabe & Burton LLP

(57) ABSTRACT

The invention relates to a novel process for the preparation of silicate comprising: reacting rice husk ash with a silicate precursor P1 to obtain a silicate S2 having a $SiO_2/M_xO$ molar ratio MR2, in which the precursor P1 is either a silicate S1 having a $SiO_2/M_xO$ molar ratio MR1 such that MR2>MR1, or a mixture of sand with metal hydroxide.

15 Claims, No Drawings

PROCESS FOR THE PREPARATION OF SILICATE AND ITS USE FOR THE PREPARATION OF PRECIPITATED SILICA

CROSS-REFERENCE TO RELATED APPLICATIONS

The present application is a U.S. national phase entry under 35 U.S.C. § 371 of International Application No. PCT/EP2016/073401, filed on 30 Sep. 2016, which claims priority to European Application No. 15306639.4, filed on Oct. 15, 2015, the entire content of each of these applications is hereby incorporated herein by reference for all purposes.

TECHNICAL FIELD

The present invention relates to a novel process for the preparation of silicate from rice husk ash and a process for the preparation of precipitated silica from this silicate.

BACKGROUND ART

It is known that silicates, in particular sodium silicates, are obtained by hot treatment of natural quartz sand with strong bases such as sodium hydroxide or potassium hydroxide. For example, sodium silicate may be obtained by direct attack of sand with sodium hydroxide according to the reaction

n $SiO_2$+2 NaOH·n$SiO_2$, $Na_2O$+$H_2O$.

It is known to employ these silicates, in particular sodium silicates, as raw material for the preparation of precipitated silica.

Silicates can also be obtained from rice husk ash. Rice husk is considered as industrial waste in rice mills.

Rice milling industry generates large amounts of waste rice husk, which represents about 22% by weight of the total weight of the harvested rice.

Rice husk is often used as fuel in the rice mills to generate steam for the parboiling process. Upon burning, about 20% of the weight of rice husk is converted into ash which is known as rice husk ash. Rice husk ash in turn contains around 80%-90% by weight of amorphous silica with a very low crystallinity, where the main crystalline phase is typically cristobalite, in addition to carbon impurities and various metals in trace amount such as magnesium, potassium, iron, aluminium, calcium.

Several uses have been described for the amorphous silica obtained from rice husk ash.

The preparation of precipitated silica from rice husk ash is described in WO 01/74712 and WO 2004/073600 that disclose processes for preparing precipitated silica by addition of an acid to a silicate solution obtained by caustic digestion of biomass ash.

U.S. Pat. No. 5,833,940 discloses the preparation of a soluble silicate formed by the dissolution in an alkali solution of biogenetic silica, e.g. rice husk ash.

The process to make precipitated silica starting from sand typically comprises a step wherein sand is dissolved with a strong base, such as sodium hydroxide or potassium hydroxide, to obtain a silicate. This step is generally carried out in the presence of an excess of the strong base. In the subsequent precipitation reaction, silica is formed by addition of a proportional amount of acidifying agent, e.g. sulfuric acid, to the silicate solution. Thus, it is important to reduce the amount of base used during the preparation of silicate as this will consequently reduce the amount of acidifying agent to be used in the preparation of precipitated silica.

DISCLOSURE OF INVENTION

A first objective of the present invention is to provide a novel process for preparing silicate having a high $SiO_2/M_xO$ molar ratio which can be used as raw material for the preparation of precipitated silica.

A further objective of the present invention consists in providing a process for preparing silicate with an increased $SiO_2/M_xO$ molar ratio without increasing the amount of base used. The process of the invention allows preparing a silicate with a high $SiO_2/M_xO$ molar ratio while using a reduced overall amount of base with respect to the prior art.

A first object of the invention is a process for the preparation of a silicate S2 comprising the step of: reacting rice husk ash with at least one silicate precursor P1 to obtain a silicate S2 having a $SiO_2/M_xO$ molar ratio $MR_2$, in which the precursor P1 is:
    either a silicate S1 having a $SiO_2/M_xO$ molar ratio $MR_1$ such that $MR_2 > MR_1$,
    or a mixture of sand with at least one metal hydroxide.

In the present specification the expression "rice husk ash" is used to refer to a $SiO_2$—containing material obtained by the burning of rice husk, and which contains silica in an amorphous state, unburned carbon and minerals. The expression "silica in an amorphous state" is used herein to indicate both amorphous silica as well as silica having a low degree of crystallinity which is typically in the cristobalite phase.

The term "silicate" is used herein to refer to a compound selected from the group consisting of the alkali metal silicates. Silicates may be usually defined according to their $SiO_2/M_xO$ molar ratio (MR), i.e. according to the number of silica molecules associated with one metal oxide molecule.

In the expression $SiO_2/M_xO$ molar ratio, M is a metal selected from the group consisting of the alkaline metals and x is 2. For the avoidance of doubt alkaline metals correspond to the group 1 elements according to IUPAC nomenclature.

The silicate is advantageously selected from the group consisting of sodium and potassium silicate. M is accordingly selected from Na and K.

The silicate may be in any known form, such as metasilicate or disilicate.

The expression "silicate precursor" is used herein to indicate a compound or a mixture of compounds being a silicate or making it possible to obtain a silicate.

The term "sand" is used herein to refer to natural quartz sand. The expressions "sand" and "quartz sand" may be used interchangeably.

In a first embodiment of the inventive process, the at least one silicate precursor P1 is a silicate S1 having a $SiO_2/M_xO$ molar ratio $MR_1$ such as $MR_2 > MR_1$.

Silicate S1 can be in any known form such as metasilicates, disilicates. Advantageously, silicate S1 is an alkali metal silicate, especially sodium or potassium silicate.

Silicate S1 may be obtained from the hot treatment of quartz sand. Silicate S1 may be typically prepared by direct attack of sand with an alkali hydroxide, especially sodium hydroxide or potassium hydroxide, according to the reaction:

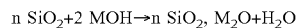
n $SiO_2$+2 MOH→n $SiO_2$, $M_2O$+$H_2O$ wherein M is Na or K.

Silicate S1 may contain residual sand. The content of residual sand may be between 2 and 8% by weight.

In general, silicate S1 used in the process according to the invention has a $SiO_2/M_xO$ molar ratio $MR_1$ of at least 1.80, in particular of at least 2.00, preferably of at least 2.40. Molar ratio MR1 is generally of at most 2.70.

When silicate S1 is sodium silicate, $MR_1$ is typically from 2.00 to 2.70, in particular from 2.40 to 2.70.

When silicate S1 is potassium silicate, $MR_1$ is typically from 1.80 to 2.50, in particular from 1.90 to 2.20

According to this first embodiment, the reaction between rice husk ash and the at least one silicate S1 comprises the following steps:
 (i) reacting rice husk ash with at least one silicate S1 in an aqueous medium so as to obtain a liquid mixture comprising silicate and solid by-products,
 (ii) separating said solid by-products from the liquid mixture to obtain a solution of silicate S2.

The reaction between rice husk ash and silicate S1 is carried out in the absence of any base. For the avoidance of doubt in the present specification the term "base" does not include alkali metal silicates.

The process typically comprises an additional step, carried out before step (i), wherein a mixture comprising rice husk ash, the at least one silicate S1 and water is formed.

Generally the at least one silicate S1 is in the form of a solution in water. When silicate S1 is in the form of a solution in water additional water may optionally be added to the reaction mixture.

Conveniently, the process according to the first embodiment may comprise the following steps:
 (i-3) providing a solution of at least one silicate S1 in an aqueous medium;
 (i-2) providing rice husk ash;
 (i-1) mixing said solution and said rice husk ash to from a mixture;
 (i) reacting rice husk ash with the at least one silicate S1 in the aqueous medium so as to obtain a liquid mixture comprising silicate and solid by-products,
 (ii) separating said solid by-products from the liquid mixture to obtain a solution of silicate S2.

Preferably, the amount of rice husk ash in the mixture in step (i) is at least 10% by weight, preferably at least 20% by weight of the total weight of silicate S1 (calculated as dry weight) and rice husk ash. The amount of rice husk ash in the mixture is generally between 10 and 40% by weight.

Step (i) according to the invention is generally carried out in stirred reactors at controlled temperature and pressure. Step (i) may be also carried out in an autoclave.

The reaction in step (i) is generally carried out at a constant temperature of between 130 and 250° C., in particular between 160 and 220° C., preferably between 165 and 210° C.

The pressure of the reaction is generally between 3 and 25 bars, in particular between 6 and 20 bars, preferably between 7 and 20 bars.

The timing of reaction step (i) may vary and may range from 30 minutes to 5 hours, in particular 2 to 4 hours. A timing of 3 hours has been found to be suitable for reaction step (i).

In the process according to this first embodiment, on conclusion of step (i), a liquid mixture comprising silicate S2, having a $SiO_2/M_xO$ molar ratio $MR_2$ such as $MR_2 > MR_1$ and solid by-products is obtained.

The solid by-products typically comprise carbon present in the rice husk ashes, residual silica and other insoluble materials originally present in the rice husk ashes.

Silicate S2 is dissolved in the aqueous medium.

In step (ii) of this first embodiment, the solid by-products are separated from the liquid mixture obtained at the end of step (i) (liquid/solid separation). Said separation step is carried out in order to eliminate impurities and in particular the carbon present in the rice husk ashes.

The separation step (ii) of the process according to the invention usually comprises a filtration. The filtration is carried out according to any suitable method, for example using a filter press, a belt filter or a vacuum filter. It is also possible to use a carbon bed to eliminate for example aluminium, potassium or iron present in the rice husk ashes.

Preferably, this filtration is performed with a vacuum filter.

Silicate S2 obtained at the end of step (ii) of the process is characterised by a $SiO_2/M_xO$ molar ratio $MR_2$ which is higher than the $SiO_2/M_xO$ molar ratio $MR_1$ of silicate S1.

In a second embodiment of the inventive process, the at least one precursor silicate P1 is a mixture of sand with at least one metal hydroxide.

The at least one metal hydroxide used in this second embodiment is typically an alkali hydroxide. Preferably, the at least one metal hydroxide is sodium hydroxide or potassium hydroxide, more preferably it is sodium hydroxide. Sand is natural quartz sand.

According to this second embodiment, the process of the invention comprises the following steps:
 (i') reacting rice husk ash with sand and at least one metal hydroxide in an aqueous medium to obtain a liquid mixture comprising silicate S2, and solid by-products,
 (ii') separating said solid by-products from the liquid mixture to obtain a solution containing silicate S2.

The process typically comprises an additional step, carried out before step (i'), wherein a mixture comprising rice husk ash, sand, the at least one metal hydroxide and water is formed. Conveniently, the process according to the second embodiment may comprise the following steps:
 (i'-4) providing sand;
 (i'-3) providing rice husk ash;
 (i'-2) providing at least one metal hydroxide as a solution in water;
 (i'-1) mixing said sand, said rice husk ash and said metal hydroxide to from an aqueous mixture;
 (i') reacting rice husk ash with sand and the at least one metal hydroxide in the aqueous medium to obtain a liquid mixture comprising silicate S2, and solid by-products,
 (ii') separating said solid by-products from the liquid mixture to obtain a solution containing silicate S2.

Preferably, the amount of rice husk ash in the liquid mixture is at least 40% by weight, in particular 50% by weight, of the total weight of sand and rice husk ash. The amount of rice husk ash in the liquid mixture does not typically exceed 80% by weight of the total weight of sand and rice husk ash.

Step (i') according to the invention is generally carried out in stirred reactors at controlled temperature and pressure. Step (i') may be also carried out in an autoclave.

The reaction in step (i') is generally carried out at a constant temperature of between 130 and 250° C., in particular between 160 and 240° C., preferably between 180 and 235° C., for example between 190 and 230° C.

The pressure of the reaction is generally between 3 and 40 bars, in particular 6 and 25 bars, preferably between 18 and 25 bars.

The timing of reaction step (i') may vary and may range from 30 minutes to 5 hours, in particular 2 to 4 hours. A timing of 3 hours has been found to be suitable for reaction step (i').

In the process according to this second embodiment, on conclusion of step (i'), a liquid mixture comprising silicate S2 and solid by-products is obtained.

The solid by-products typically comprise amorphous carbon present in the rice husk ashes, residual silica, residual sand and other insoluble materials originally present in the rice husk ashes.

Silicate S2 is dissolved in the aqueous medium.

In step (ii') of this second embodiment, the solid by-products are separated from the liquid mixture obtained at the end of step (i') (liquid/solid separation). Said separation step is carried out in order to eliminate in particular the amorphous carbon present in the rice husk ashes and the residual sand.

The separation can be carried out using the method described above for the first embodiment.

It may be desirable following the separation step in the first and in the second embodiments of the inventive process to dry the silicate S2 solution to obtain silicate S2 in the crystalline form. Drying can be carried out using any known means. Preferably, the drying operation is carried out by atomization. To this end, use may be made of any type of suitable atomizer, in particular a rotary, nozzle, liquid pressure or two-fluid atomizer.

Silicate S2 obtained at the end of step (ii) or of step (ii') and on the conclusion of the possible drying operation has a $SiO_2/M_xO$ molar ratio $MR_2$.

Silicate S2 typically has a molar ratio $MR_2$ of at least 2.30 and of at most 3.80.

When silicate S2 obtained on the conclusion of step (ii) and of step (ii') is sodium silicate, molar ratio $MR_2$ is at least 2.50, in particular at least 2.80, typically at least 3.00, preferably at least 3.20. Molar ratio $MR_2$ is generally between 2.50 and 3.80, preferably between 2.80 and 3.80, more preferably between 2.80 and 3.70.

When silicate S2 obtained on the conclusion of step (ii) and of step (ii') is potassium silicate, molar ratio $MR_2$ is at least 2.30, in particular at least 2.50, preferably at least 2.80. Molar ratio $MR_2$ is generally between 2.30 and 3.80, preferably between 2.80 and 3.70.

Another object of the invention is the use of silicate S2 for the preparation of silica, in particular precipitated silica.

Thus an additional object of the invention is a process for the preparation of a precipitated silica, which comprises the steps of:
  reacting a silicate with at least one acidifying agent in an aqueous liquid medium, to obtain a suspension of precipitated silica,
  separating the precipitated silica from the aqueous liquid medium to provide wet precipitated silica, and
  drying said wet precipitated silica to obtain precipitated silica,
wherein at least one portion of the silicate is silicate S2 obtained from rice husk ash by the process which is the first object of the invention.

The silicate is preferably sodium silicate.

The silicate used in the process for the preparation of precipitated silica may consist of silicate S2. Alternatively, silicate S2 may represent only a portion of the silicate used for the preparation of precipitated silica. The other portion of the silicate may be for example an alkali metal silicate obtained from the hot treatment of sand.

The choice of the acidifying agent is made in a way well known in the art. Use is generally made, as acidifying agent, of a strong inorganic acid, such as sulfuric acid, nitric acid or hydrochloric acid, or also of an organic acid, such as acetic acid, formic acid or carbonic acid.

The acidifying agent can be dilute or concentrated; its normality can be between 0.4 and 36N, for example between 0.6 and 2.5N.

In particular, in the case where the acidifying agent is sulfuric acid, its concentration can be between 40 and 180 g/l, for example between 60 and 130 g/l.

The process for the preparation of precipitated silica can be carried out according to conditions well known in the art. Non-limiting examples of processes for the preparation of precipitated silica are disclosed for instance in EP520862, EP670813, EP670814, EP917519, WO 95/09127, WO 95/09128, WO 98/54090, WO 03/016215, WO 2009/112458 or WO 2012/010712.

Thus, the preparation of precipitated silica by reaction of a silicate, in particular sodium silicate, with an acidifying agent can be carried out according to any method of preparation, in particular by addition of an acidifying agent to a feedstock of silicate, in particular sodium silicate, or else by simultaneous addition, total or partial, of acidifying agent and of silicate, in particular sodium silicate, to a feedstock of water, or of silicate, or of acidifying agent.

In the process according to the invention, on conclusion of the step of the reaction of precipitation between silicate and acidifying agent, a suspension of precipitated silica is obtained. The precipitated silica is subsequently separated (liquid/solid separation).

The separation carried out in the preparation process according to the invention, usually comprises a filtration, followed by a washing operation, if necessary. The filtration is carried out according to any suitable method, for example using a filter press, a belt filter or a vacuum filter.

The silica suspension thus recovered (filtration cake) is subsequently dried.

Drying can be carried out according to any means known in the art.

Preferably, the drying operation is carried out by atomization. To this end, use may be made of any type of suitable atomizer, in particular a rotary, nozzle, liquid pressure or two-fluid atomizer.

It should be noted that the wet precipitated silica is not always under conditions which make possible atomization, in particular because of its high viscosity. In a way known per se, the wet precipitated silica is then subjected to a disintegration operation, generally in the presence of an aluminium compound and optionally in the presence of an acidifying agent, such as described above. This operation can be carried out mechanically, by passing the cake into a mill of colloid or bead type. The disintegration operation makes it possible in particular to lower the viscosity of the suspension to be subsequently dried.

When the drying operation is carried out using a nozzle atomizer, the precipitated silica then obtained usually exists in the form of substantially spherical beads.

On conclusion of the drying operation, the product recovered can then be subjected to a milling stage. The precipitated silica which is obtained generally exists in the form of a powder.

When the drying is carried out using a rotary atomizer, the precipitated silica then obtained can exist in the form of a powder.

Finally, the precipitated silica, dried or milled as indicated above, can optionally be subjected to an agglomeration stage which comprises, for example, a direct compression, a wet granulation (that is to say, with the use of a binder, such as water, silica suspension, and the like), an extrusion or, preferably, a dry compacting.

The precipitated silica then obtained by this agglomeration stage generally exists in the form of granules.

The process for the preparation of a precipitated silica according to the invention makes it possible, with respect to a process using only silicate from sand providing the same amount of precipitated silica, to reduce the amount of metal hydroxide, in particular sodium hydroxide, and/or the amount of acidifying agent, in particular sulfuric acid, used in the process.

As an additional advantage, when the acidifying agent is sulfuric acid, a reduction of the amount of sodium sulfate formed as by-product during the precipitation step is observed.

The precipitated silica prepared by the process according to the invention may be used in many applications.

It may be used, for example, as a catalyst support, as an absorbent for active materials (in particular a support for liquids, especially that are used in food, such as vitamins (vitamin E), choline chloride), in polymer, especially elastomer or silicone compositions, as a viscosity enhancer, texturizer or anticaking agent, as a battery separator element, and as an additive for toothpaste, concrete or paper.

However, it finds a particularly advantageous application in the reinforcement of natural or synthetic polymers.

The polymer compositions in which it may be used, especially as a reinforcing filler, are generally based on one or more polymers or copolymers, in particular on one or more elastomers, preferably having at least one glass transition temperature between −150° C. and +300° C., for example between −150° C. and +20° C.

As possible polymers, mention may be made especially of diene polymers, in particular diene elastomers.

Mention may be made, as non-limiting examples of finished articles based on said polymer compositions, of footwear soles, tires, floor coverings, gas barriers, fire retardant materials, and also technical parts such as rollers for cableways, seals for domestic electrical appliances, seals for liquid or gas pipes, braking system seals, (flexible) pipes, sheathings (especially cable sheathings), cables, engine supports, conveyor belts and transmission belts. Should the disclosure of any patents, patent applications, and publications which are incorporated herein by reference conflict with the description of the present application to the extent that it may render a term unclear, the present description shall take precedence.

The following examples illustrate the invention without, however, limiting the scope thereof.

EXAMPLES

Example 1

The following materials were introduced into a reactor of Parr type equipped with a system for stirring and a temperature and pressure controller:
- 283 grams of water,
- 387 grams of sand,
- 402 grams of rice husk ash,
- 484 grams of sodium hydroxide solution (50% by weight).

The liquid mixture was heated and held at a temperature of around 220° C. at a pressure of 23 bars over 3 hours.

On conclusion of the reaction, the liquid mixture was filtered under vacuum to eliminate the non-reacted materials. A solution of sodium silicate exhibiting a $SiO_2/Na_2O$ molar ratio equal to 3.50 was obtained.

Example 2

The following materials were introduced into a reactor of Parr type equipped with a system for stirring and a temperature and pressure controller:
- 583 grams of water,
- 386 grams of sand,
- 844 grams of rice husk ash,
- 479 grams of sodium hydroxide solution (50% by weight).

The liquid mixture was heated and held at a temperature of around 207° C. at a pressure of 18 bars over 3 hours.

On conclusion of the reaction, the liquid mixture was filtered under vacuum to eliminate the non-reacted materials. A solution of sodium silicate exhibiting a $SiO_2/Na_2O$ molar ratio equal to 3.50 was obtained.

The silicate obtained in Examples 1 and 2, can be used as a starting silicate solution for the preparation of precipitated silica. Compared to processes for the preparation of precipitated silica using only silicate from sand providing the same amount of precipitated silica, the following are observed when silicates obtained by the process according to the invention are used in processes for the preparation of precipitated silica:
- a saving in sodium hydroxide consumption of 29%
- a saving in sulfuric acid consumption of 29%.

Example 3

The following materials were introduced into a reactor of Parr type equipped with a system for stirring and a temperature and pressure controller:
- 1300 grams of sodium silicate solution obtained from sand, containing 24% ($m_{SiO2}/m_{solution}$) silicate and exhibiting a $SiO_2/Na_2O$ molar ratio ($MR_1$) equal to 2.50,
- 158 grams of rice husk ash.

The liquid mixture was heated and held at a temperature of around 170° C. and at a pressure of 7 bars for a period of 3 hours.

On conclusion of the reaction, the liquid mixture was filtered under vacuum to eliminate the non-reacted materials. A solution of sodium silicate exhibiting a $SiO_2/Na_2O$ molar ratio ($MR_2$) equal to 3.50 was obtained.

The inventive process allows to significantly increase the $SiO_2/Na_2O$ molar ratio of sodium silicate obtained from sand from 2.50 to a value of 3.50 while using the same amount of sodium hydroxide.

Taking into account the lower amount of sodium hydroxide and sulphuric acid used in the silica precipitation process the increase in productivity in terms of precipitated silica (calculated as amount of starting material per kg of precipitated silica produced) may be estimated to be for example from 15% to 40%. A corresponding reduction in the overall production costs can also be achieved.

Example 4

The following materials were introduced into a reactor of Parr type equipped with a system for stirring and temperature and pressure controller:
- 671 g of water,
- 250 g of sand,
- 81 g of rice husk ash,
- 430 g of potassium hydroxide solution (50% by weight).

The liquid mixture was heated and held at a temperature of around 210° C. and at pressure of 18 bars for a period of 3 hours.

On conclusion of the reaction, the liquid mixture was filtered under vacuum to eliminate the non-reacted materials. A solution of potassium silicate exhibiting a $SiO_2/K_2O$ molar ratio equal to 2.30 was obtained.

Example 5

The following were introduced into a reactor of Parr type equipped with a system for stirring and temperature and pressure controller:
583 g of water,
307 g of sand,
242 g of rice husk ash,
479 g of potassium hydroxide solution (50% by weight).

The liquid mixture was heated and held at a temperature of around 207° C. and at a pressure of 18 bars for a period of 3 hours.

On conclusion of the reaction, the liquid mixture was filtered under vacuum to eliminate the non-reacted materials. A solution of potassium silicate exhibiting a $SiO_2/K_2O$ molar ratio equal to 3.40.

Example 5

The following were introduced into a reactor of Parr type equipped with a system for stirring and temperature and pressure controller:
890 g of potassium silicate solution exhibiting a $SiO_2/K_2O$ molar ratio equal to 2.15 (28.12 wt % of $SiO_2$, 13.51 wt % of $K_2O$ and 58.34 wt % of water),
126 g of rice husk ash.

The liquid mixture was heated and held at a temperature of around 170° C. and at a pressure of 7 bars for a period of 3 hours On conclusion of the reaction, the liquid mixture was filtered under vacuum to eliminate the non-reacted materials and to obtain a solution of potassium silicate exhibiting a $SiO_2/K_2O$ molar ratio equal to 3.40.

The inventive process allows to significantly increase the $SiO_2/K_2O$ molar ratio of sodium silicate obtained from sand from 2.15 to a value of 3.40 without the need to add an additional amount of potassium hydroxide.

The invention claimed is:

1. A process for the preparation of a silicate S2, the process comprising: reacting rice husk ash with at least one silicate precursor P1 to obtain a silicate S2 having a $SiO_2/M_xO$ molar ratio $MR_2$, wherein the at least one silicate precursor P1 is either: a silicate S1 having a $SiO_2/MxO$ molar ratio $MR_1$, such that $MR_2 > MR_1$; or a mixture of sand with at least one metal hydroxide;
   wherein M is a metal selected from the group consisting of alkaline metals and x is 2;
   wherein, when silicate precursor P1 is the silicate S1, the method further comprises preparing the silicate S1 by direct attack of said with an alkali hydroxide.

2. The process according to claim 1, wherein molar ratio $MR_2$ is at least 2.30 and at most 3.80.

3. The process according to claim 1, wherein the at least one silicate precursor P1 is the silicate S1 having a $SiO_2/M_xO$ molar ratio $MR_1$, such that $MR_2 > MR_1$.

4. The process according to claim 3, wherein molar ratio $MR_1$ is at least 1.80 and at most 2.70.

5. The process according to claim 3, wherein the process comprises the steps of:
   (i) reacting rice husk ash with at least one silicate S1 in an aqueous medium so as to obtain a liquid mixture comprising silicate and solid by-products, and
   (ii) separating said solid by-products from the liquid mixture to obtain a solution of silicate S2.

6. The process according to claim 5, wherein the solution of silicate S2 is dried so as to obtain a silicate S2.

7. The process according to claim 5, wherein the amount of rice husk ash in the liquid mixture is at least 10% by weight of the total weight of silicate S1 and rice husk ash.

8. The process according to claim 1, wherein silicate S1 is an alkali metal silicate.

9. The process according to claim 1, wherein the at least one silicate precursor P1 is a mixture of sand with at least one metal hydroxide.

10. The process according to claim 9, wherein the metal hydroxide is selected from sodium hydroxide and potassium hydroxide.

11. The process according to claim 9, wherein the process comprises:
   (i') reacting rice husk ash with sand and at least one metal hydroxide in an aqueous medium to obtain a liquid mixture comprising silicate S2 and solid by-products, and
   (ii') separating said solid by-products from the liquid mixture to obtain a solution of silicate S2.

12. The process according to claim 11, wherein the amount of rice husk ash in the liquid mixture is at least 30% by weight of the total weight of sand and rice husk ash.

13. The process according to claim 11, wherein the solution of silicate S2 is dried so as to obtain a silicate S2.

14. The process according to claim 1, further comprising using silicate S2 to prepare a precipitated silica, wherein the using comprises:
   reacting silicate S2 with at least one acidifying agent in an aqueous liquid medium to obtain a suspension of precipitated silica,
   separating the precipitated silica from the aqueous liquid medium to provide wet precipitated silica, and
   drying said wet precipitated silica to obtain precipitated silica.

15. A process for the preparation of precipitated silica, the process comprising:
   reacting rice husk ash with at least one silicate precursor P1 to obtain a silicate S2 having a $SiO_2/M_xO$ molar ratio $MR_2$, wherein the at least one silicate precursor P1 is: either a silicate S1 having a $SiO_2/M_xO$ molar ratio $MR_1$, such that $MR_2 > MR_1$; or a mixture of sand with at least one metal hydroxide, wherein M is a metal selected from the group consisting of alkaline metals and x is 2, wherein, when silicate precursor P1 is the silicate S1, the method further comprises preparing the silicate S1 by direct attack of sand with an alkali hydroxide
   reacting silicate S2 with at least one acidifying agent in an aqueous liquid medium to obtain a suspension of precipitated silica,
   separating the precipitated silica from the aqueous liquid medium to provide wet precipitated silica, and
   drying said wet precipitated silica to obtain precipitated silica.

* * * * *

UNITED STATES PATENT AND TRADEMARK OFFICE
CERTIFICATE OF CORRECTION

Page 1 of 1

PATENT NO. : 11,027,981 B2
APPLICATION NO. : 15/768287
DATED : June 8, 2021
INVENTOR(S) : Philippe Jost et al.

It is certified that error appears in the above-identified patent and that said Letters Patent is hereby corrected as shown below:

In the Claims

In Claim 1, Column 9, Line 58, the word "said" should read -- sand --.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*